(12) United States Patent
Basheer

(10) Patent No.: US 11,244,399 B2
(45) Date of Patent: Feb. 8, 2022

(54) INTELLIGENT PORTFOLIO REPLICATION

(71) Applicant: Wells Fargo Bank, N.A., San Francisco, CA (US)

(72) Inventor: Zamsheer Basheer, Bangalore (IN)

(73) Assignee: Wells Fargo Bank, N.A., San Francisco, CA (US)

(*) Notice: Subject to any disclaimer, the term of this patent is extended or adjusted under 35 U.S.C. 154(b) by 21 days.

(21) Appl. No.: 16/058,580

(22) Filed: Aug. 8, 2018

(65) Prior Publication Data

US 2020/0051171 A1    Feb. 13, 2020

(51) Int. Cl.
*G06Q 40/06* (2012.01)
*G06Q 50/00* (2012.01)

(52) U.S. Cl.
CPC ............ *G06Q 40/06* (2013.01); *G06Q 50/01* (2013.01)

(58) Field of Classification Search
CPC ........ G06Q 40/00; G06Q 40/20; G06Q 40/06; G06Q 50/01
See application file for complete search history.

(56) References Cited

U.S. PATENT DOCUMENTS

| | | | |
|---|---|---|---|
| 6,430,542 B1 | 8/2002 | Moran | |
| 6,829,590 B1* | 12/2004 | Greener | G06Q 40/025 705/31 |
| 8,165,948 B2 | 4/2012 | O'Shaughnessy et al. | |
| 8,694,402 B2 | 4/2014 | Arnott et al. | |
| 9,367,873 B2 | 6/2016 | Wottowa et al. | |
| 9,569,755 B2 | 2/2017 | Dyor | |
| 2002/0147670 A1* | 10/2002 | Lange | G06Q 30/08 705/35 |
| 2004/0177022 A1* | 9/2004 | Williams | G06Q 40/00 705/36 R |
| 2007/0265952 A1* | 11/2007 | Kridel, Jr. | G06Q 40/02 705/36 R |
| 2008/0195524 A1* | 8/2008 | Quinlivan | G06Q 40/04 705/37 |
| 2008/0313071 A1* | 12/2008 | Hughes | G06Q 40/04 705/37 |
| 2009/0063363 A1* | 3/2009 | Present | G06Q 40/04 705/36 R |

(Continued)

FOREIGN PATENT DOCUMENTS

WO    2017149524    9/2017

*Primary Examiner* — Bennett M Sigmond
*Assistant Examiner* — Xavier M. Bennett
(74) *Attorney, Agent, or Firm* — Womble Bond Dickinson (US) LLP

(57) ABSTRACT

The innovation disclosed and claimed herein, in one aspect thereof, comprises systems and methods of intelligent portfolio replication. The innovation receives an investment action request from a user. The investment action request is associated with a user investment account having a destination portfolio. The investment action request indicates a target portfolio. The target portfolio includes investments that are accessed. Allocations of each investment in the target portfolio are determined. The innovation determines trades that replicate the target portfolio using the determined allocations and a designated value of the destination portfolio. The trades are executed such that the target portfolio is replicated in the destination portfolio according to the allocations.

13 Claims, 6 Drawing Sheets

(56) References Cited

U.S. PATENT DOCUMENTS

| | | | | |
|---|---|---|---|---|
| 2009/0119227 A1* | 5/2009 | Green | G06Q 20/10 | |
| | | | 705/36 R | |
| 2009/0299908 A1* | 12/2009 | Lindstrom | G06Q 40/04 | |
| | | | 705/36 R | |
| 2011/0071958 A1* | 3/2011 | Grody | G06Q 40/00 | |
| | | | 705/36 R | |
| 2011/0264473 A1* | 10/2011 | Abreu | G06Q 40/06 | |
| | | | 705/4 | |
| 2011/0289017 A1* | 11/2011 | Renshaw | G06Q 40/06 | |
| | | | 705/36 R | |
| 2013/0031021 A1* | 1/2013 | Salminen | G06Q 40/06 | |
| | | | 705/36 R | |
| 2013/0132301 A1* | 5/2013 | Abreu | G06Q 40/06 | |
| | | | 705/36 R | |
| 2013/0268423 A1* | 10/2013 | Giles | G06Q 40/04 | |
| | | | 705/37 | |
| 2014/0351171 A1* | 11/2014 | Samson | G06Q 40/06 | |
| | | | 705/36 R | |
| 2015/0120609 A1* | 4/2015 | Riviere | G06Q 40/06 | |
| | | | 705/36 R | |
| 2015/0317733 A1* | 11/2015 | Chibly | G06Q 20/223 | |
| | | | 705/37 | |
| 2016/0225086 A1* | 8/2016 | Seitz | G06Q 40/06 | |
| 2017/0213290 A1 | 7/2017 | Praul et al. | | |
| 2018/0089758 A1* | 3/2018 | Stradling | G06F 12/1408 | |
| 2018/0276756 A1* | 9/2018 | Planitzer | G06Q 30/018 | |
| 2019/0087896 A1* | 3/2019 | Assia | G06F 16/9535 | |
| 2020/0013059 A1* | 1/2020 | Mariappan | G06Q 20/401 | |

\* cited by examiner

INTELLIGENT PORTFOLIO REPLICATION

BACKGROUND

Starting an investment account is often an intimidating task for novice customers. Often, customers keep money in underperforming savings accounts due to inexperience and trust issues with stocks and other investment opportunities. New customers will usually have to rely on the expertise of an investment banker. However, the investment banker is a stranger to the customer. Customers can feel more comfortable taking advice from a known and trusted source.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of intelligent portfolio replication. The replication can receive an investment action request from a user, the investment action request associated with a user investment account having a destination portfolio. A target portfolio is accessed. The target portfolio having a set of investments, wherein the investment action request indicates the target portfolio. The set of investments are replicated in the destination portfolio A system of the innovation can include a request component that receives an investment action request from a user, the investment action request associated with a user investment account having a destination portfolio. An account component accesses a target portfolio, the target portfolio having a set of investments, wherein the investment action request indicates the target portfolio. A clone component replicates the set of investments in the destination portfolio.

A computer readable medium has instructions to control one or more processors. The instructions include receiving an investment action request from a user, the investment action request associated with a user investment account having a destination portfolio. The instructions include accessing a target portfolio, the target portfolio having a set of investments, wherein the investment action request indicates the target portfolio. The instructions include determining allocations of each investment in the set of investments as a percentage of total value of the target portfolio. The instructions include determining trades that replicate the target portfolio using the determined allocations and the designated value of the destination portfolio. The instructions include executing the trades, wherein the trades convert cash on hand or at least one investment of the destination portfolio into a replicated set of investments in the destination portfolio equal to the designated value.

In aspects, the subject innovation provides substantial benefits in terms of investment banking. One advantage resides in easily onboarding new or novice investors. Another advantage resides in an automated replication of a known investor's portfolio.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
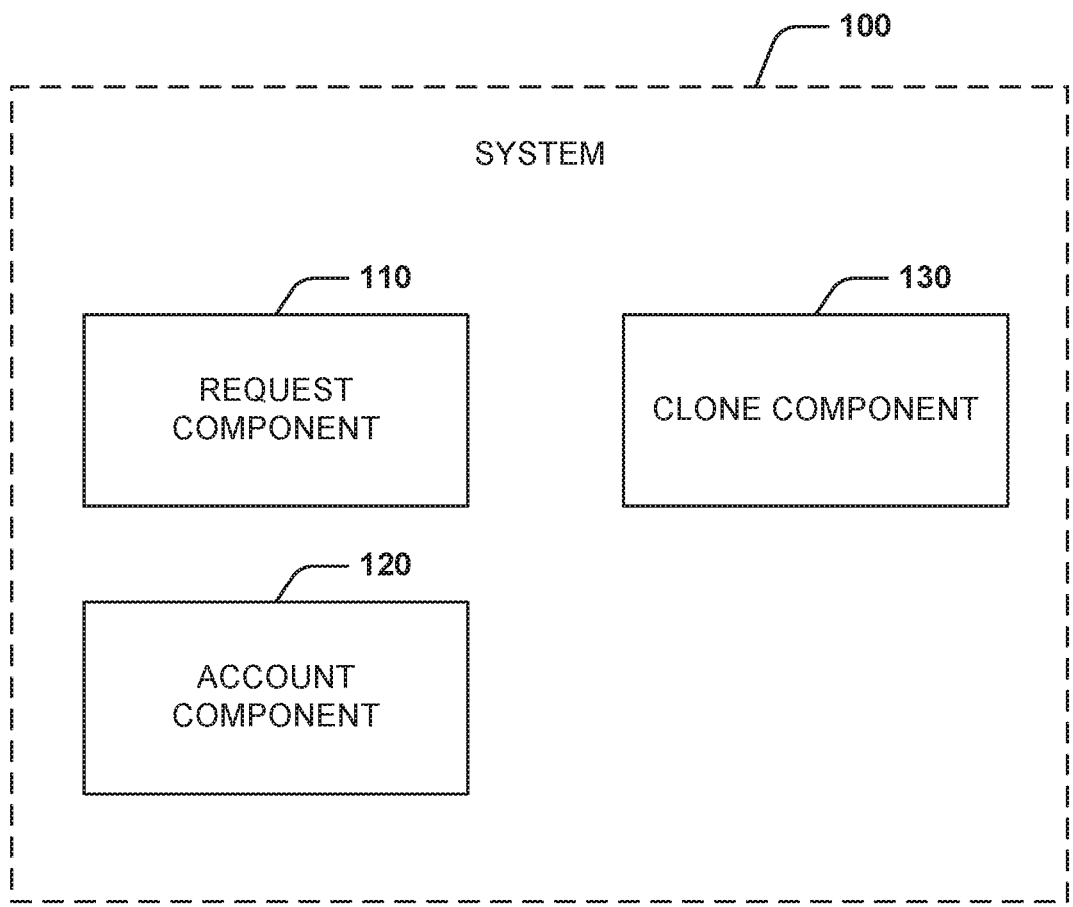
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, many modifications may be made to this configuration without departing from the scope or spirit of the claimed subject matter.

FIG. 1 illustrates a system 100 for intelligent portfolio replication. The system 100 can replicate (or "clone") a target portfolios to a destination portfolio. The system 100 includes a request component 110. The request component 110 receives an investment action request. The investment action request can be generated by a user or a user representative such as an investment banker or another employee of a financial institution. The investment action request is associated with the user and/or a user investment account. In some embodiments, the investment action request is submitted via a user device (e.g. a computer, mobile device, and/or the like) having an application (e.g. an "app", a social media website, and/or the like.

In some embodiments, the investment account is a newly created investment account. For example, a new customer of a financial institution wishes to create a new account. The new customer can provide onboarding information via the investment action request.

In other embodiments, the investment account is an existing investment account. The investment account includes a destination portfolio. The destination portfolio can be a subsection of the investment account or the entire investment account. The destination portfolio can include available funds or cash to be used for investments, current investments, a mixture of cash and investments, and/or the like.

The investment action request indicates a target portfolio. The target portfolio is an investment portfolio to be replicated or cloned. The target portfolio can be selected by the user or user representative. In some embodiments, the target portfolio is associated with a friend, family member, and/or the like associated with the user. In other embodiments, the target portfolio is associated with a publicized figure and is made public by the figure.

In some embodiments, the investment action request includes a request to replicate a target user's account structure, other financial products, and/or the like for the user. Other target features to be replicated can be bank related products, portfolio allocation, fund manager, fee structure, account types (retirement, savings account etc.) standard brokerage or fee based account structures, and/or the like. The investment action request may request a full account replication or selected products or structure.

The request component 110 determines a designated value of the destination portfolio to be used for replication from the investment action request. The investment action request can include the designated value that is less than or equal to a total value of the destination portfolio. The value can be designated by the user or a user representative.

In some embodiments, the request component 110 determines an industry tag from the investment action request. The industry tag can indicate a designated industry type. For example, the investment action request can indicate an industry type of technology. The request component 110 can indicate that only investments associated with technology are to be replicated.

In some embodiments, the request component 110 determines social media data of the user. The request component 110 can access a list of connections of the user via a social media website. In some embodiments, the request component 110 accesses the social media data using an API call and response.

The request component 110 can use the social media data to confirm the target customer is a connection of the user in the set of people. In some embodiments, the request component 110 can generate and send a notice to the target customer that their target portfolio is to be replicated. The notice can include the investment action request. In some embodiments, the request component 110 can receive a consent authorization from the target customer, such that the target customer authorizes the replication of the target portfolio based on the investment action request and/or the notice.

In some embodiments, authorization can be given using an electronic signature (e.g. ESIGN, UETA, and/or the like), biometric scanning (fingerprint, facial recognition, and/or the like), a one-time passcode with validity, a combination of authorizations, and/or the like. In some embodiments, the authorization is given using a web API call and response and/or the like.

In some embodiments, the request component 110 determines biographic data of the user and biographic data of the list of connections from the social media data. The request component 110 can match a person that is connect to the user both having similar biographic data. The request component 110 designates the person as the target customer having the target portfolio to be replicated.

The system 100 includes an account component 120. The account component 120 accesses the target portfolio. The account component 120 can access account information of the target portfolio and/or the target customer from a financial institution, investment brokerage firm, and/or the like. The account component 120 can utilize an API call and response to retrieve the account information from the financial institutions.

The system 100 includes a clone component 130. The clone component 130 replicates the set of investments of the target portfolio in the destination portfolio. The clone component 130 receives the account information of the target portfolio from the account component 120. The clone component 130 determines allocations of each investment in the set of investments in the target portfolio. In some embodiments, the clone component 130 calculates each allocation as a percentage of total value of the target portfolio. In some embodiments, the clone component 130 determines a subset of investments in the target portfolio. For example, the clone component 130 receives an industry tag from the request component 110. The clone component 130 sorts the investments in the target portfolio such that it creates a subset that only includes investments associated with the industry tag.

The clone component 130 determines trades that replicate the target portfolio. In some embodiments, the clone component 130 determines an exact replication of the target portfolio such that the destination portfolio is identical to the target portfolio according to overall value and allocation. In other embodiments, the clone component 130 uses the determined percentages of total value of the target portfolio for each investment and applies the percentages for each investment to the total value or destination value of the destination portfolio.

The clone component 110 executes the determined trades. The trades can be purchasing investments using funds in the destination portfolio such that the destination portfolio results in having the same specific investments in the same allocations as the target portfolio. In some embodiments, the trades convert cash on hand or an existing investment of the destination portfolio into a replicated set of investments.

In some embodiments, the clone component 110 receives a final consent to execute the trades. The clone component 110 may provide the trades for review to the user on a user device as described above. In some embodiments, the clone component 110 can request further personal information needed to complete the trades.

Figure 2:
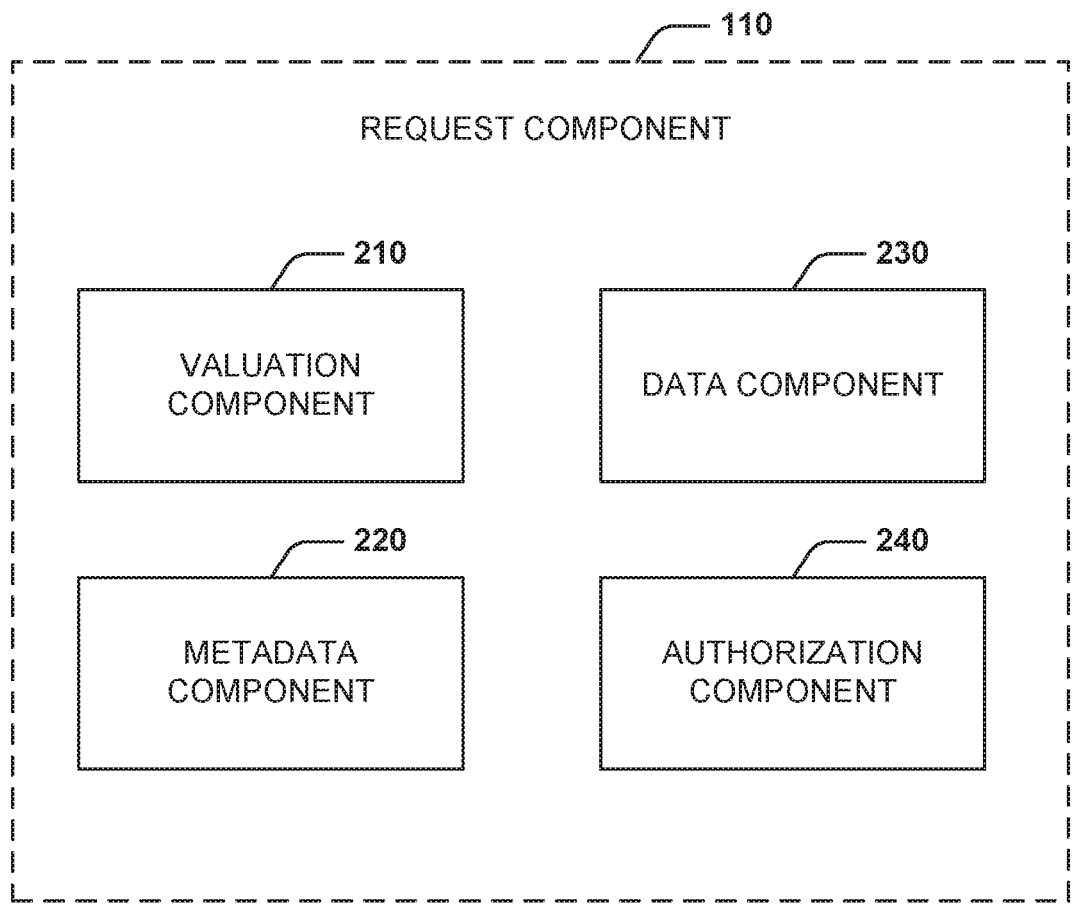
FIG. 2 illustrates an example component diagram of a request component.

FIG. 2 illustrates a detailed component diagram of the request component 110. The request component 110 receives an investment action request as described in detail above. The request component 110 includes a valuation component 210. The valuation component 210 can extract or determine a valuation of the destination portfolio using the investment action request. In some embodiments, the valuation component 210 determines a designated value of the destination portfolio to be used for replication from the investment action request. The investment action request can include the designated value that is less than or equal to a total value of the destination portfolio. The value can be designated by the user or a user representative.

In some embodiments, the request component 110 includes a metadata component 220. The metadata component 220 extracts or determines metadata, tags, and/or the like from the investment action request. For example, the metadata component 220 can determine an industry tag from the investment action request. The industry tag indicates a designated industry type. For example, the investment action request can indicate an industry type of technology.

In some embodiments, the request component 110 includes a data component 230. The data component 230 determines social media data of the user. The data component 230 can access a list of connections of the user via a social media website. In some embodiments, the data component 230 accesses the social media data using an API call and response.

The request component 110 includes an authorization component 240. The authorization component 240 can use the social media data to confirm the target customer is a connection of the user in the set of people. In some embodiments, the authorization component 240 can generate and send a notice to the target customer that their target portfolio is to be replicated. The notice can include the investment action request. In some embodiments, the authorization component 240 receives a consent authorization from the target customer, such that the target customer authorizes the replication of the target portfolio based on the investment action request and/or the notice.

In some embodiments, the data component 230 determines biographic data of the user and biographic data of the list of connections from the social media data. The data component 230 can match a person that is connected to the user both having similar biographic data. The data component 230 designates the person as the target customer having the target portfolio to be replicated.

Figure 3:
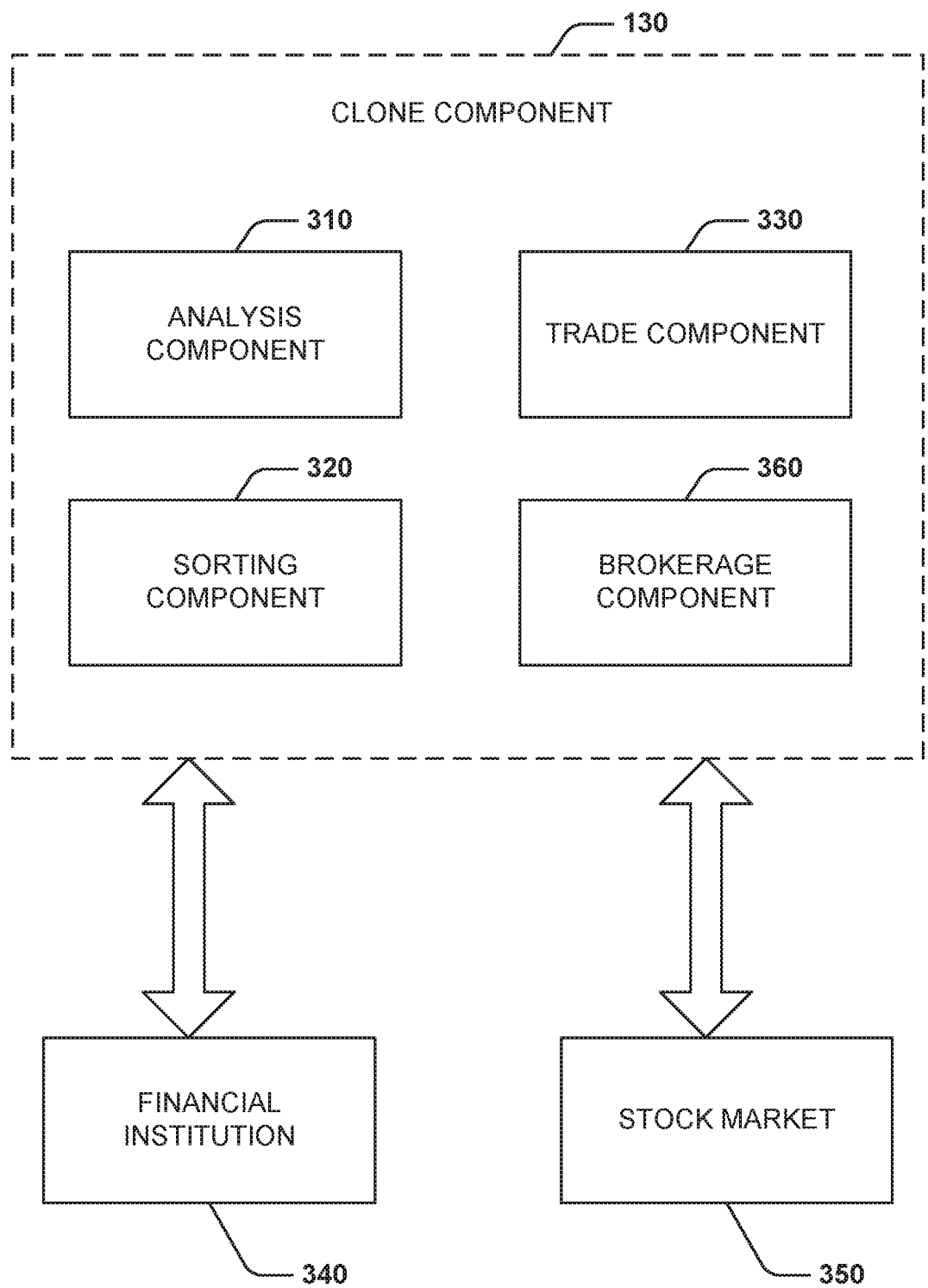
FIG. 3 illustrates an example component diagram of a clone component.

FIG. 3 illustrates a component diagram of a clone component 130. The clone component includes an analysis component 310. The analysis component 310 receives the account information of the target portfolio from the account component 120. The analysis component 310 determines allocations of each investment in the set of investments in the target portfolio. In some embodiments, the analysis component 310 calculates each allocation as a percentage of total value of the target portfolio.

In some embodiments, the clone component 130 receives or determines a subset of investments in the target portfolio. The clone component 130 includes a sorting component 320. The request component 110 and/or the metadata component 220 indicate that investments associated with technology are to be replicated. The sorting component 320 can parse the investments in the target portfolio and select the investments that are related to technology. In some embodiments, the sorting component 320 can read and/or apply tags to investments.

The clone component 130 includes a trade component 330. The trade component 330 determines trades that replicate the target portfolio. In some embodiments, the trade component 330 determines an exact replication of the target portfolio such that the destination portfolio is identical to the target portfolio according to overall value and allocation. In other embodiments, the trade component 330 uses the determined percentages of total value of the target portfolio for each investment and applies the percentages for each investment to the total value or destination value of the destination portfolio.

In some embodiments, the trade component 330 reads the investments in the target portfolio from a financial institution 340. In other embodiments, the trade component 330 can track the prices of each investment to be replicated by accessing a stock market 350 and/or other trading platform, software, information aggregator, and/or the like. The trade component 330 can use prices for end of trading for the day, start of trading for the day, and/or other price option used in stock trading and is selected by the user, user representative, or replicated preference of the target customer.

The clone component 130 includes a brokerage component 360. The brokerage component 360 executes the determined trades on the stock market 350. The trades can be purchasing investments using funds in the destination portfolio such that the destination portfolio results in having the same specific investments in the same allocations as the target portfolio. In some embodiments, the trades convert cash on hand or an existing investment of the destination portfolio into a replicated set of investments. The brokerage component 360 can be a system integrated with the financial institution 340, a third party trading system, and/or the like.

Figure 4:
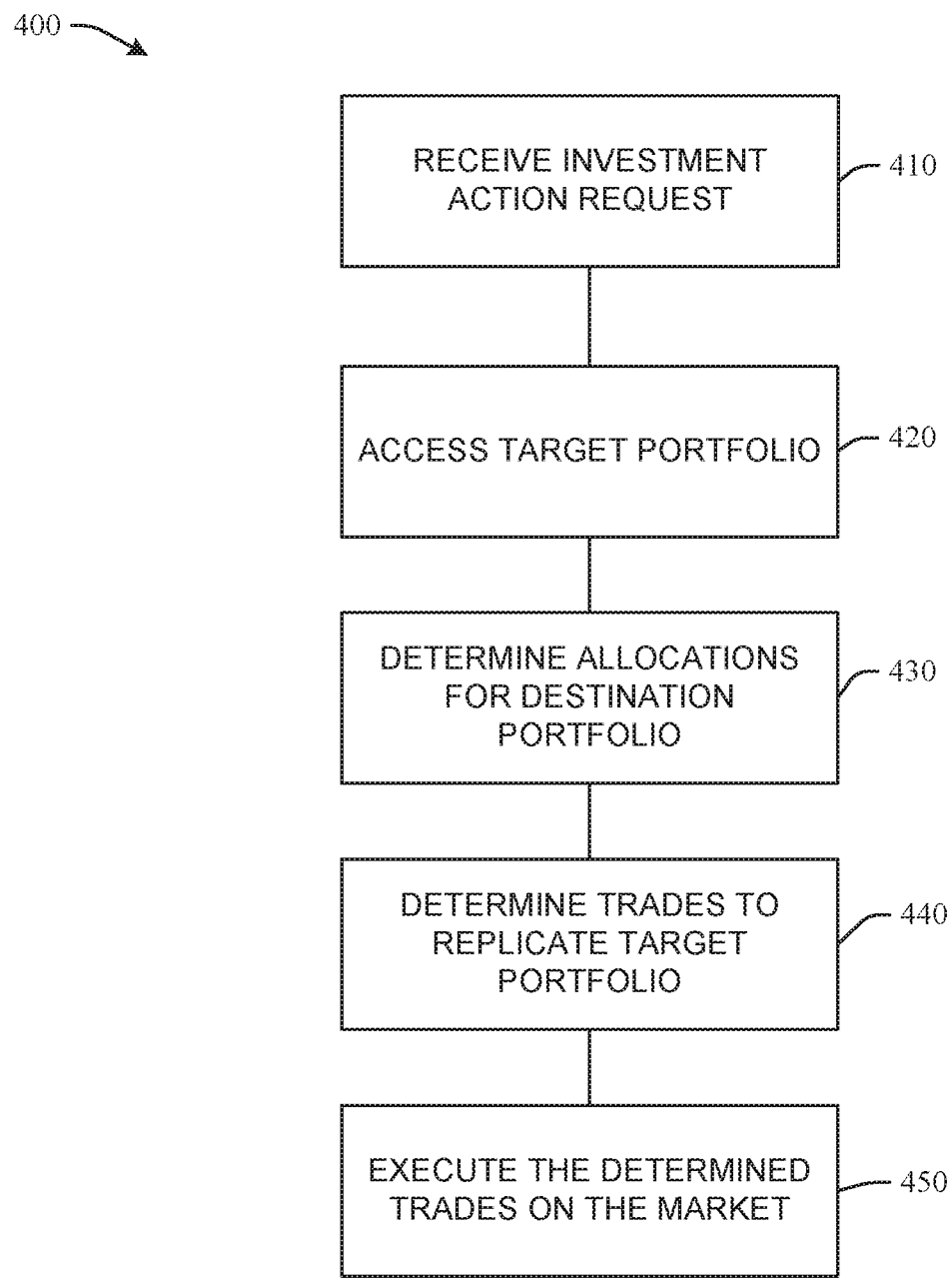
FIG. 4 illustrates a method for intelligent portfolio replication.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

FIG. 4 illustrates a method 400 for intelligent portfolio replication. At 410, an investment action request is received from a user. The investment action request is associated with a user investment account having a destination portfolio. The investment action request can include a target portfolio, a target customer, an industry tag, a designated value to replicate, and/or the like. For example, a user wishes to open a new investment account but does not have any experience with investing. The user has a family member that has extensive experience with investing and has a similar biographic profile to the family member according to age, employment history, family status, and/or the like. The user can provide an investment action request indicating his new destination portfolio that he has opened, the family member as the target customer, and amount of money the user wants to use for the new investments.

At 420, a target portfolio is accessed. The target portfolio includes a set of investments. In the example, the family member is a customer of a financial institution. The family member's investment portfolio can be found in the financial institution and accessed to obtain account and/r investment information. At 430, allocations of each investment are determined as a percentage of total value of the target portfolio. Continuing the example, to replicate the family member's portfolio (i.e. the target portfolio), each percent distribution for each investment is calculated. This ensures the privacy of the family member to not share the total value of his portfolio as only percentages may be shared and replicated.

At 440, trades are determined that replicate the target portfolio using the determined allocations and the designated value of the destination portfolio. In the example, the stock market is accessed to retrieve prices for the different investments to replicate. The trades are determined based on the stock price of the investments, the total value to be replicated in the destination portfolio, the determined percentage allocations for each investment, and/or the like. At 450, the trades are executed. The trades convert cash on hand and/or investment(s) of the destination portfolio into a replicated set of investments in the destination portfolio equal to the designated value to be replicated.

Figure 5:
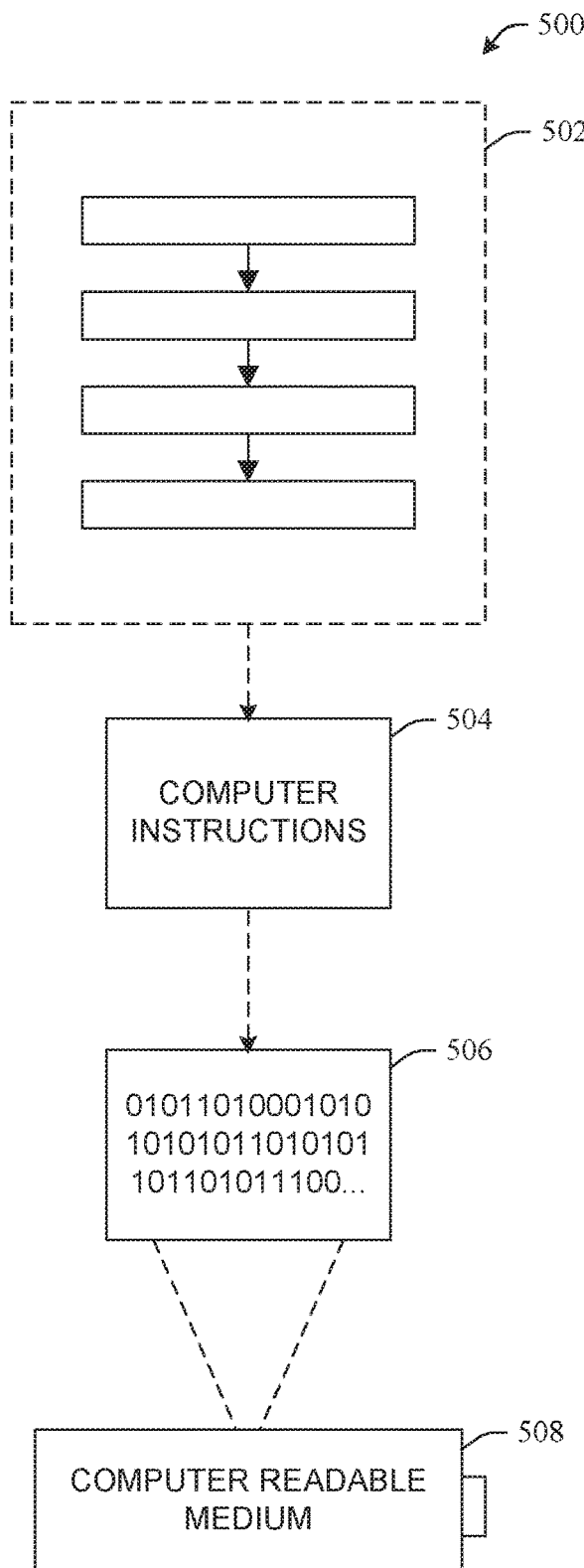
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
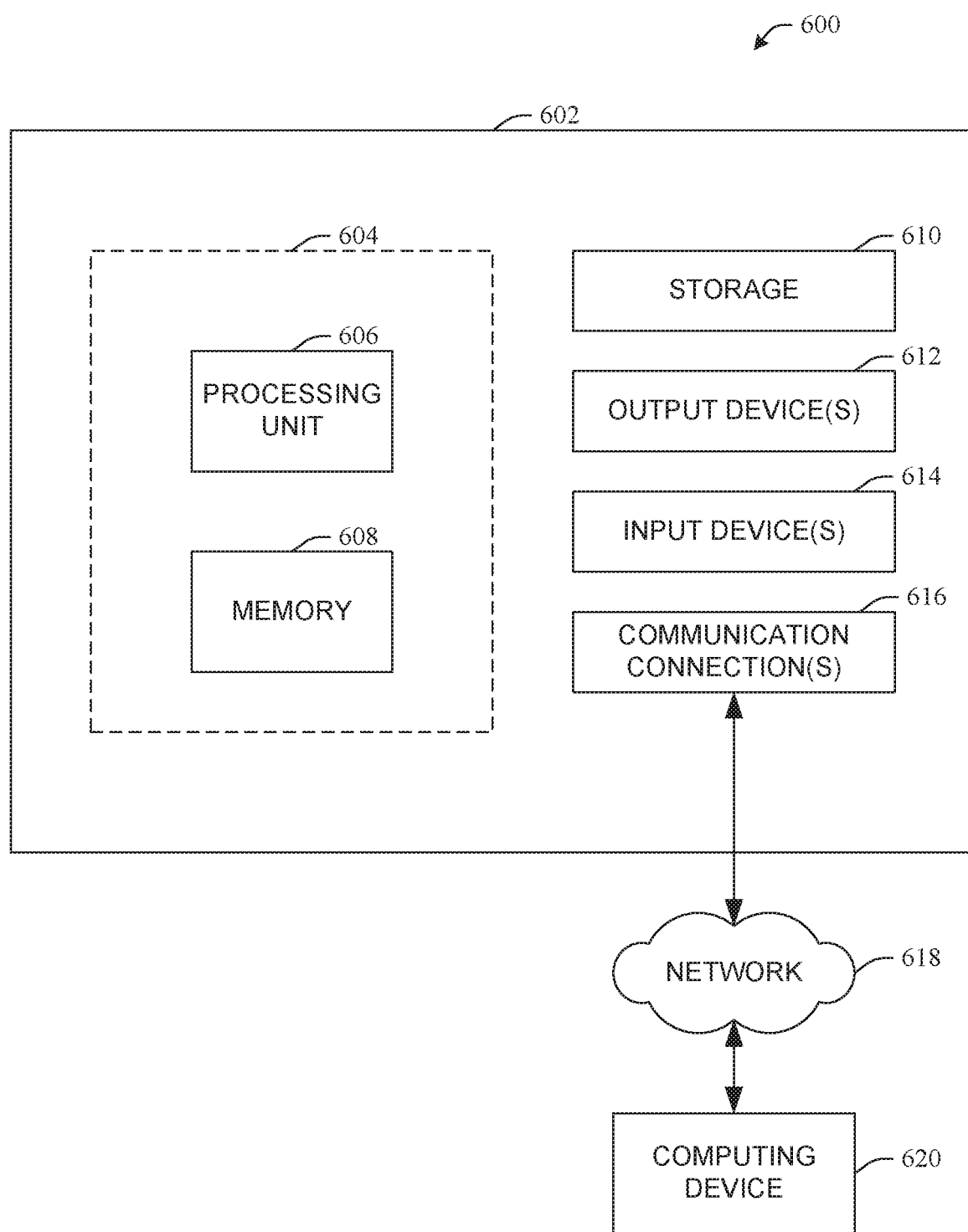
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, at a system having a processor, an investment action request from a user, the investment action request associated with a user investment account having a destination portfolio, wherein the investment action request indicates a target portfolio that is to be replicated and is associated with a target customer;
determining, by the system, remote social media data from a personal digital social media account associated with the user, the remote social media data including a list of connections of the user to a set of other social media accounts;
authenticating, by the system, the investment action request by confirming the target customer is a connection of the user in the set of other social media accounts and determining the remote social media data;
generating and sending, by the system, a notice to the target customer, wherein the notice includes the investment action request;
receiving a consent authorization from the target customer such that the target customer authorizes replication of the target portfolio based on the investment action request or the notice, wherein the consent authorization is an electronic signature or biometric scanning;
accessing, by the system, the target portfolio based on the consent authorization, the target portfolio having a set of investments, an account structure, bank related products, a portfolio allocation, a fund manager, a fee structure, and an account type;
determining metadata tags for each investment in the set of investments, wherein the metadata tags include an industry tag;
applying the metadata tags to each investment in the set of investments; and
replicating the target portfolio in the destination portfolio such that the destination portfolio includes a subset of investments having a matching metadata tag to a requested metadata tag in the investment action request, the account structure, the portfolio allocation, the fund manager, the fee structure, trading preferences of the target customer, and the account type.

2. The method of claim 1, comprising:
determining a designated value of the destination portfolio to be used for replication from the investment action request, wherein the designated value is less than or equal to a total value of the destination portfolio.

3. The method of claim 2, wherein replicating the set of investments comprises:
determining allocations of each investment in the set of investments as a percentage of total value of the target portfolio;
determining trades that replicate the target portfolio using the determined allocations and the designated value of the destination portfolio; and
executing the trades, wherein the trades convert cash on hand or at least one investment of the destination portfolio into a replicated set of investments in the destination portfolio equal to the designated value.

4. The method of claim 1, comprising:
determining an industry tag from the investment action request, the industry tag indicating a designated industry type;
determining a subset of investments from the set of investments, wherein the subset includes investments associated with the industry tag; and
replicating the subset of investments in the destination portfolio.

5. The method of claim 1, further comprising:
determining social media data of the user, the social media data including a list of connections of the user to a set of people and biographic data of the user and the list of connections;
matching a person in the set of people to the user, the person and the user having similar biographic data; and
designating the person as the target customer having the target portfolio to be replicated.

6. The method of claim 1, wherein the target portfolio is a publicized portfolio made public by the target customer for replication.

7. A system, comprising:
a processor that executes computer executable components stored in a memory, the computer executable components comprising:
a request component that receives an investment action request from a user, the investment action request associated with a user investment account having a destination portfolio, wherein the investment action request indicates a target portfolio that is to be replicated and is associated with a target customer;
the request component comprising:
a data component that:
determines remote social media data from a personal digital social media account associated with the user, the remote social media data including a list of connections of the user to a set of other social media accounts,
authenticates the investment action request by confirming the target customer is a connection of the user in the set of other social media accounts and determining the remote social media data, and
generates and sends a notice to the target customer, wherein the notice includes the investment action request;
an authorization component that receives a consent authorization from the target customer such that the target customer authorizes replication of the target portfolio based on the investment action request or the notice, wherein the consent authorization is an electronic signature or biometric scanning;
an account component that accesses the target portfolio based on the consent authorization, the target portfolio having a set of investments, an account structure, bank related products, a portfolio allocation, a fund manager, a fee structure, and an account type;
a metadata component that:
determines metadata tags for each investment in the set of investments, wherein the metadata tags include an industry tag, and
applies the metadata tags to each investment in the set of investments; and
a clone component that replicates the target portfolio in the destination portfolio such that the destination portfolio includes a subset of investments having a matching metadata tag to a requested metadata tag in the investment action request, the account structure, the portfolio allocation, the fund manager, the fee structure, trading preferences of the target customer, and the account type.

8. The system of claim 7, wherein the request component determines a designated value of the destination portfolio to be used for replication from the investment action request, wherein the designated value is less than or equal to a total value of the destination portfolio.

9. The system of claim 8, the clone component comprises:
an analysis component that determines allocations of each investment in the set of investments as a percentage of total value of the target portfolio;
a trade component that determines trades that replicate the target portfolio using the determined allocations and the designated value of the destination portfolio; and
a brokerage component that executes the trades, wherein the trades convert cash on hand or at least one investment of the destination portfolio into a replicated set of investments in the destination portfolio equal to the designated value.

10. The system of claim 7, wherein
the metadata component determines an industry tag from the investment action request, the industry tag indicating a designated industry type;
wherein a sorting component determines a subset of investments from the set of investments, the subset including investments associated with the industry tag; and
wherein the clone component replicates the subset of investments in the destination portfolio.

11. The system of claim 7, the request component comprising:
a data component that:
determines social media data of the user, the social media data including a list of connections of the user to set of people and biographic data of the user and the list of connections,
matches a person in the set of people to the user, the person and the user having similar biographic data, and
designates the person as the target customer having the target portfolio to be replicated.

12. The system of claim 7, wherein the target portfolio is a publicized portfolio made public by the target customer for replication.

13. A non-transitory computer readable medium having instructions to control one or more processors configured to:
receive an investment action request from a user, the investment action request associated with a user investment account having a destination portfolio;
determine remote social media data from a personal digital social media account associated with the user, the remote social media data including a list of connections of the user to a set of other social media accounts and biographic data of the user and biographic data of each account in the set of other social media accounts;
match a social media account in the set of other social media accounts to the remote social media data of the user, the social media account and the user having similar biographic data;
designate a customer associated with the social media account as a target customer having a target portfolio to be replicated;
generate and send a notice to the target customer, wherein the notice includes the investment action request;
receive a consent authorization from the target customer such that the target customer authorizes replication of the target portfolio based on the investment action request or the notice, wherein the consent authorization is an electronic signature or biometric scanning;
access the target portfolio, the target portfolio having a set of investments, an account structure, bank related products, a portfolio allocation, a fund manager, a fee structure, and an account type;
determine metadata tags for each investment in the set of investment, wherein the metadata tags include an industry tag;
apply the metadata tags to each investment in the set of investments; and
replicate the target portfolio in the destination portfolio such that the destination portfolio includes a subset of investments having a matching metadata tag to a requested metadata tag in the investment action request, the account structure, the portfolio allocation, the fund manager, the fee structure, trading preferences of the target customer, and the account type, wherein the replicating comprises:
determining allocations of each investment in the set of investments as a percentage of total value of the target portfolio,
determining trades that replicate the set of investments using the portfolio allocations and a designated value of the destination portfolio, and
executing the trades, wherein the trades convert cash on hand or at least one investment of the destination portfolio into a replicated set of investments in the destination portfolio equal to the designated value.

* * * * *